Patented Dec. 4, 1945

2,390,102

UNITED STATES PATENT OFFICE 2,390,102

PRINTING INKS

Francis J. Jeuck, Chicago, and Charles A. Rietz, Park Ridge, Ill., assignors to Interchemical Corporation, New York, N. Y., a corporation of Ohio No Drawing. Application January 28, 1944, Serial No. 520,106

3 Claims. (Cl. 106—30)

This invention relates to printing inks designed to be set by the application of water thereto and to provide an inexpensive ink of this type, characterized by good resistance to humidity during the printing operation.

Inks which may be dried by the application of water upon the freshly printed film and methods of printing with such inks are disclosed and claimed in Gessler et al. United States Patent No. 2,157,385, dated May 9, 1939. Such inks contain a water-soluble solvent, usually a polyglycol or a polyether alcohol. When water is sprayed upon or otherwise added to a printed film of an ink of this character, it causes the ink binder to be precipitated so that upon evaporation or removal of the solvent and water, such as by penetration into the paper, the ink is substantially dry. Due to the fact that the solvents best suited for use in these inks are hygroscopic, difficulties in operation are encountered when the weather is humid.

Various methods have been suggested to overcome this problem, among others the use of rosin modified by the diene addition of maleic, fumaric acid or similar alpha beta unsaturated acids (United States Patent No. 2,244.104, June 3, 1941). While somewhat improved resistance to humid weather is obtained with these inks, they still leave much to be desired.

In our copending application Serial No. 458,457, filed September 12, 1942, we have disclosed that printing inks having good printing properties and good moisture resistance can be obtained by the use of the reaction product of Vinsol and an alpha beta unsaturated polybasic acid dissolved in a water-soluble polyglycol or polyglycol derivative.

We have now discovered that the condensation of the Vinsol with maleic anhydride is not necessary, and that satisfactory moisture setting printing inks can be obtained from Vinsol alone in combination with water-soluble polyglycols as the solvent.

Vinsol is a material obtained in the preparation of wood rosin. In preparing the Vinsol resin, the stumps are disintegrated or shredded, and the shredded material is extracted in large heated cylinders by means of a solvent such as benzol or some other suitable aromatic hydrocarbon. The solvent extracts the Vinsol resin along with the rosin, turpentine, pine oil and miscellaneous other materials from the shredded stumps, after which the liquid is subjected to a distillation process. In the distilling cycle, the solvent is the first material to be removed, followed by the turpentine and finally the pine oil, the residue consisting of rosin and Vinsol remaining in the still. The molten resin is then run into a hot mixture of gasoline and furfural. The mixture is then allowed to stand and settle until two liquid layers have formed, one consisting of gasoline and rosin, and the other consisting of Vinsol and furfural. The latter layer is then run through a continuous still whereby the furfural is removed, and the Vinsol resin comes out in a hot molten state, being run into sheet metal containers and distributed therein in the market. The exact chemical composition of the Vinsol resin is not definitely known. It has been estimated, however, that the Vinsol resin consists essentially of a highly oxidized form of abietic acid, and much smaller proportions of resin acids, polyphenols, ligneous materials, and unoxidized abietic acid. It can be described as a petroleum hydrocarbon insoluble resin derived from pin wood.

Typical examples of our invention are the following:

*Example 1.—Black ink*

| | Parts by weight |
|---|---|
| Lamp black | 2.6 |
| Carbon black | 10.1 |
| Petrolatum | 3.5 |
| Dipropylene glycol | 28.9 |
| Vinsol | 25.9 |
| Diethylene glycol | 21.9 |
| Iron blue | 3.0 |
| Methyl violet | 1.3 |
| Talc | 2.8 |

This ink is press-stable, and sets rapidly upon being sprayed with steam or water.

Other similar inks are the following:

*Example 2.—Black ink*

| | Parts by weight |
|---|---|
| Lamp black | 1.45 |
| Carbon black | 10.63 |
| Petrolatum | 3.15 |
| Dipropylene glycol | 46.50 |
| Vinsol | 32.00 |
| Iron blue | 4.15 |
| Methyl violet | 2.05 |
| Alkali blue | .07 |

*Example 3.—Black ink*

| | Parts by weight |
|---|---|
| Lamp black | 2.6 |
| Carbon black | 10.1 |
| Petrolatum | 3.5 |
| Vinsol | 30.0 |
| Diethylene glycol | 46.7 |
| Iron blue | 3.0 |
| Methyl violet | 1.3 |
| Talc | 2.8 |

Examples can of course be multiplied indefinitely without departing from the scope of the invention. In particular, the pigments shown can be replaced by all of the other common printing ink pigments such as iron blue, chrome yellow, azo pigments, phthalocyanine blue, alkali blue, and the like. Dyestuffs such as methyl violet may also be used. While we have disclosed only diethylene glycol and dipropylene glycol as solvents in the specific examples, other water-soluble polyglycols and water-soluble polyglycol derivatives can be used.

We claim:

1. A typographic printing ink characterized by press-stability under humid conditions, combined with the ability to be set by the addition of water to the film of the ink, comprising essentially a solution of a petroleum hydrocarbon insoluble resin derived from pine wood in a water soluble polyglycol.

2. A typographic printing ink characterized by press-stability under humid conditions, combined with the ability to be set by the addition of water to the film of the ink, comprising essentially a solution of a petroleum hydrocarbon insoluble resin derived from pine wood in a solvent comprising diethylene glycol.

3. A typographic printing ink characterized by press-stability under humid conditions, combined with the ability to be set by the addition of water to the film of the ink, comprising essentially a solution of a petroleum hydrocarbon insoluble resin derived from pine wood in a solvent comprising dipropylene glycol.

FRANCIS J. JEUCK.
CHARLES A. RIETZ.

Certificate of Correction

Patent No. 2,390,102.   December 4, 1945.

FRANCIS J. JEUCK ET AL.

It is hereby certified that error appears in the printed specification of the above numbered patent requiring correction as follows: Page 1, first column, line 26, for "Patent No. 2,244.104" read *Patent No. 2,244,103*; and that the said Letters Patent should be read with this correction therein that the same may conform to the record of the case in the Patent Office.

Signed and sealed this 3rd day of August, A. D. 1948.

[SEAL]

THOMAS F. MURPHY,
*Assistant Commissioner of Patents.*